(12) United States Patent
Heo et al.

(10) Patent No.: US 11,043,681 B2
(45) Date of Patent: Jun. 22, 2021

(54) METHOD FOR OPERATING SOLID OXIDE FUEL CELL

(71) Applicant: LG CHEM, LTD., Seoul (KR)

(72) Inventors: Yeonhyuk Heo, Daejeon (KR); Sanghyeok Im, Daejeon (KR); Tai Min Noh, Daejeon (KR); Kwangyeon Park, Daejeon (KR); Kwangwook Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 286 days.

(21) Appl. No.: 16/310,923

(22) PCT Filed: Aug. 24, 2017

(86) PCT No.: PCT/KR2017/009263
§ 371 (c)(1),
(2) Date: Dec. 18, 2018

(87) PCT Pub. No.: WO2018/062695
PCT Pub. Date: Apr. 5, 2018

(65) Prior Publication Data
US 2020/0313206 A1   Oct. 1, 2020

(30) Foreign Application Priority Data
Sep. 30, 2016 (KR) .................. 10-2016-0126647

(51) Int. Cl.
*H01M 8/04089* (2016.01)
*H01M 4/90* (2006.01)
(Continued)

(52) U.S. Cl.
CPC ..... *H01M 8/04089* (2013.01); *H01M 4/9025* (2013.01); *H01M 8/04701* (2013.01);
(Continued)

(58) Field of Classification Search
CPC . H01M 2004/8684; H01M 2004/8689; H01M 2008/1293; H01M 4/9025;
(Continued)

(56) References Cited

U.S. PATENT DOCUMENTS

2011/0003235 A1* 1/2011 Hwang .................. H01M 8/12
429/495
2015/0064596 A1  3/2015 Leah et al.
2017/0237103 A1  8/2017 Choi et al.

FOREIGN PATENT DOCUMENTS

EP  2621006 A1  7/2013
JP  2004-259641 A  9/2004
(Continued)

OTHER PUBLICATIONS

Brus et al., "Change of an Anode's Microstructure Morphology During the Fuel Starvation of an Anode-supported Oxide Fuel Cell", International Journal of Hydrogen Energy, vol. 40, No. 21, Apr. 22, 2015, pp. 6927-6934.
(Continued)

*Primary Examiner* — Victoria H Lynch
(74) *Attorney, Agent, or Firm* — Birch, Stewart, Kolasch & Birch, LLP

(57) ABSTRACT

A method for driving a solid oxide fuel cell including an anode, a cathode, and an electrolyte provided between the anode and the cathode.

7 Claims, 4 Drawing Sheets

(51) Int. Cl.
*H01M 8/04701* (2016.01)
*H01M 8/04746* (2016.01)
*H01M 8/124* (2016.01)
*H01M 4/86* (2006.01)

(52) U.S. Cl.
CPC ....... *H01M 8/04746* (2013.01); *H01M 8/124* (2013.01); *H01M 2004/8684* (2013.01); *H01M 2004/8689* (2013.01); *H01M 2008/1293* (2013.01)

(58) Field of Classification Search
CPC ......... H01M 8/04089; H01M 8/04701; H01M 8/04746; H01M 8/124; Y02E 60/50
See application file for complete search history.

(56) References Cited

FOREIGN PATENT DOCUMENTS

| | | |
|---|---|---|
| JP | 2007-311288 A | 11/2007 |
| JP | 2010-61829 A | 3/2010 |
| JP | 2014-53177 A | 3/2014 |
| JP | 2015-69798 A | 4/2015 |
| JP | 2015-191833 A | 11/2015 |
| JP | 2016-100137 A | 5/2016 |
| KR | 10-2011-0009577 A | 1/2011 |
| KR | 10-2011-0060035 A | 6/2011 |
| KR | 10-2013-0130359 A | 12/2013 |
| KR | 10-2016-0059419 A | 5/2016 |
| KR | 10-2016-0083490 A | 7/2016 |

OTHER PUBLICATIONS

Eguchi et al., "Electrical Properties of Ceria-based Oxides and Their Application to Solid Oxide Fuel Cell", Solid State Iconics, vol. 52, No. 1-3, May 1, 1992, pp. 165-172.
Extended European Search Report dated May 29, 2019, for European Application No. 17856581.8.
International Search Report (PCT/ISA/210) issued in PCT/KR2017/009263, dated Nov. 30, 2017.

* cited by examiner

[Figure 1]
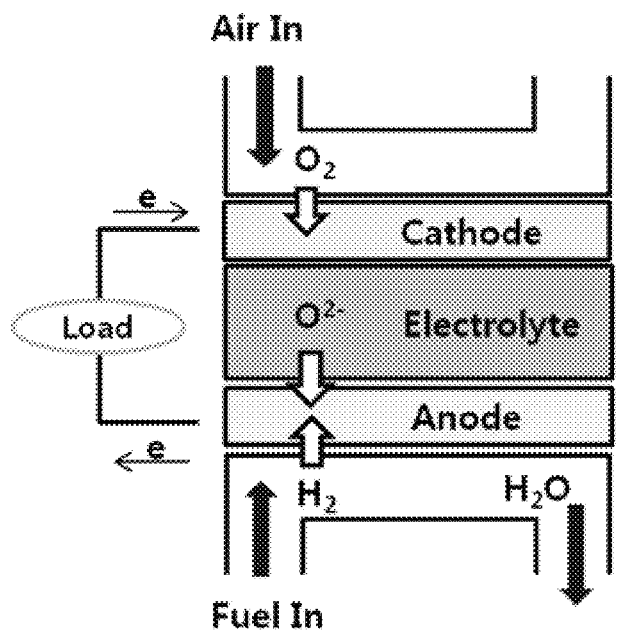
[Figure 2]
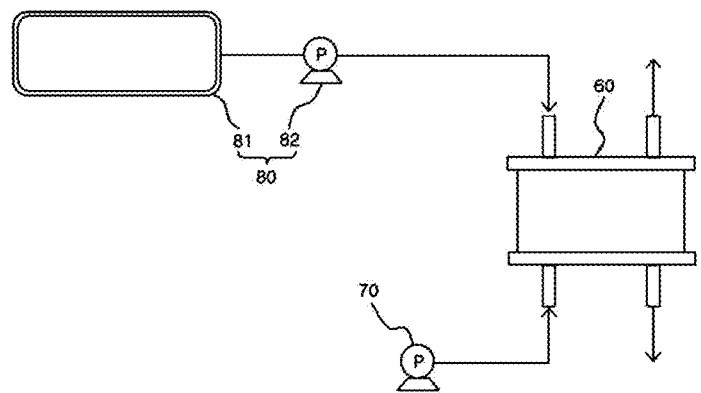

[Figure 3]
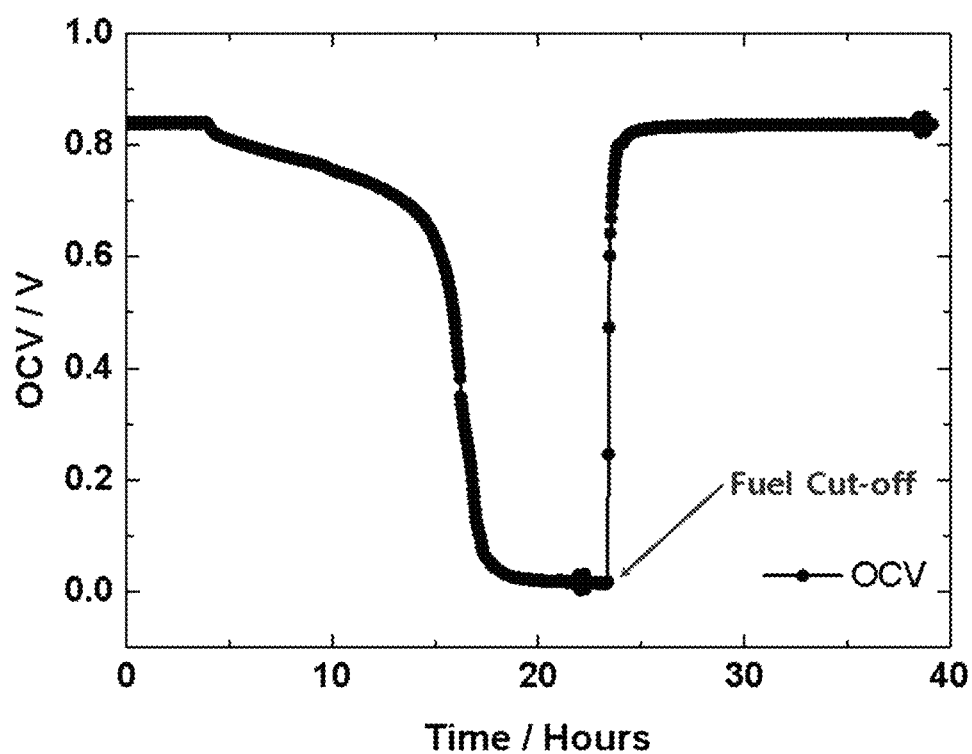

[Figure 4]
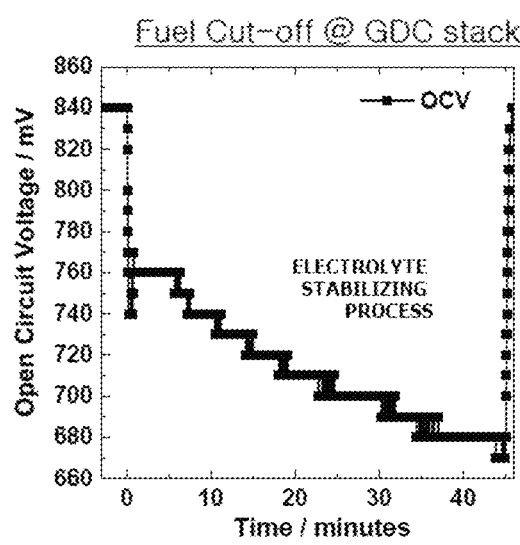
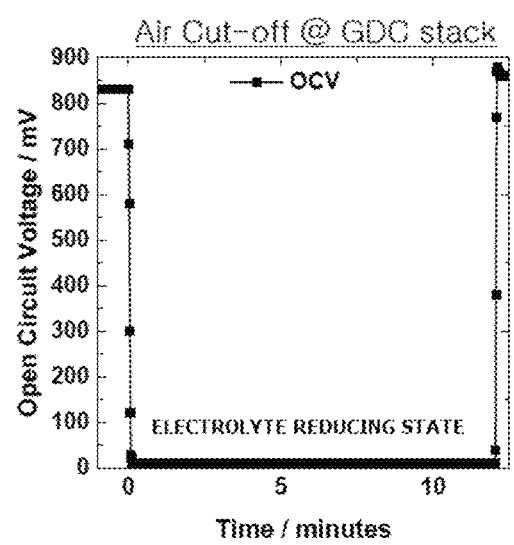

[Figure 5]
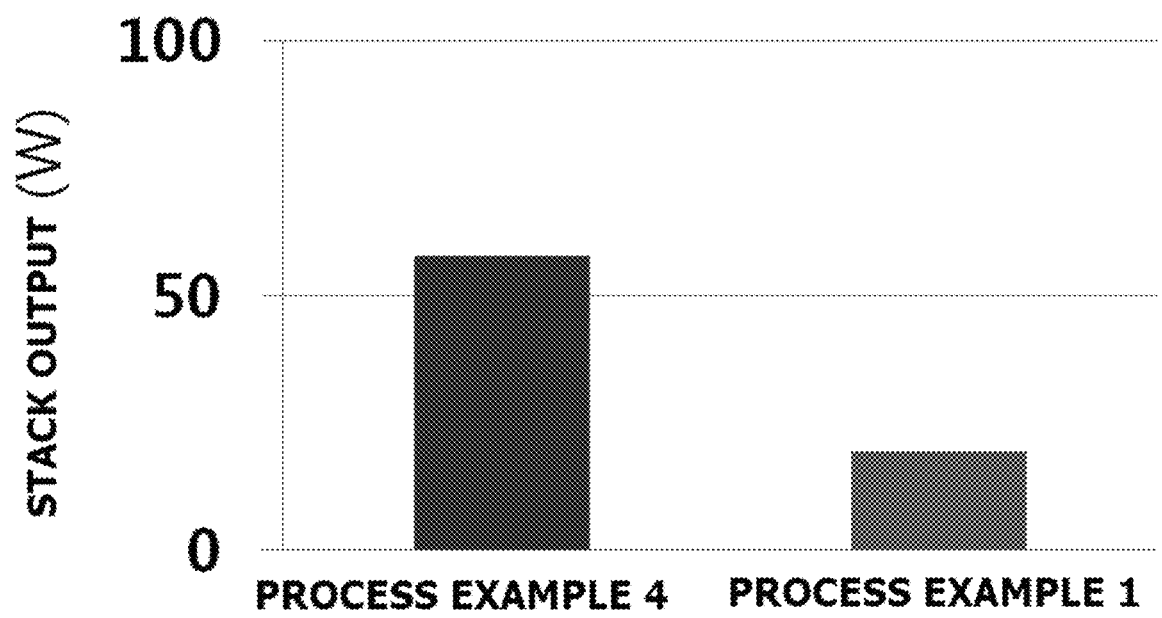

METHOD FOR OPERATING SOLID OXIDE FUEL CELL

TECHNICAL FIELD

This application claims priority to and the benefit of Korean Patent Application No. 10-2016-0126647 filed in the Korean Intellectual Property Office on Sep. 30, 2016, the entire contents of which are incorporated herein by reference.

The present specification relates to a method for driving a solid oxide fuel cell including an anode, a cathode, and an electrolyte provided between the anode and the cathode.

BACKGROUND ART

Recently, depletion of existing energy sources such as oil and coal has been predicted, and interest in energy that can replace the energy is increasing. A fuel cell as one of the alternative energy has particularly received attention due to high efficiency and merits in that pollutants such as NOx and SOx are not discharged and the used fuel is abundant.

The fuel cell is a power generation system that converts chemical reaction energy of the fuel and an oxidizer into electric energy, and hydrogen and hydrocarbons such as methanol and butane as the fuel and oxygen as the oxidizer are representatively used.

The fuel cell includes a polymer electrolyte membrane fuel cell (PEMFC), a direct methanol fuel cell (DMFC), a phosphoric acid fuel cell (PAFC), an alkaline fuel cell (AFC), a molten carbonate fuel cell (MCFC), a solid oxide fuel cell (SOFC), and the like.

Meanwhile, research on a metal air secondary battery that manufactures a cathode of the metal secondary battery as a cathode by applying a principle of the cathode of the fuel cell is required.

DETAILED DESCRIPTION OF THE INVENTION

Technical Problem

The present specification has been made in an effort to provide a method for driving a solid oxide fuel cell including an anode, a cathode, and an electrolyte provided between the anode and the cathode.

Technical Solution

An exemplary embodiment of the present specification provides a method for driving a solid oxide fuel cell including an anode, a cathode, and an electrolyte provided between the anode and the cathode and containing ceria-based metal oxide, the method including: adjusting the solid oxide fuel cell to a driving temperature; reducing NiO of the anode to Ni by supplying gas containing oxygen to the cathode and supplying gas containing hydrogen to the anode; oxidizing the electrolyte by supplying gas containing oxygen to the cathode and stopping the supply of gas containing hydrogen to the reduced anode; and driving the solid oxide fuel cell by supplying gas containing oxygen to the cathode and supplying gas containing hydrogen to the reduced anode.

Advantageous Effects

According to the exemplary embodiment of the present specification, the electrolyte including ceria-based metal oxide can improve reduction durability for hydrogen.

The method for driving the fuel cell according to the exemplary embodiment of the present specification has advantages of increasing an ion conductive contribution rate of the electrolyte and having high efficiency of the fuel cell.

BRIEF DESCRIPTION OF DRAWINGS

FIG. 1 is a schematic diagram illustrating a principle of electricity generation of a solid oxide fuel cell.

FIG. 2 is a diagram schematically illustrating an example of a battery module including a fuel cell.

FIG. 3 is a graph illustrating a change in open circuit voltage during cell driving in Process Example 3.

FIG. 4 is a graph illustrating a change in open circuit voltage according to fuel cut off and air cut off in Process Example 2.

FIG. 5 is a comparative graph of stack output in Process Examples 1 and 4.

EXPLANATION OF REFERENCE NUMERALS AND SYMBOLS

60: Battery module
70: Oxidizer supply unit
80: Fuel supply unit
81: Fuel tank
82: Pump

BEST MODE

Hereinafter, the present specification will be described in detail.

The present specification provides a method for driving a solid oxide fuel cell including an anode, a cathode, and an electrolyte provided between the anode and the cathode and containing ceria-based metal oxide.

The method for driving the solid oxide fuel cell includes: adjusting the solid oxide fuel cell to a driving temperature; reducing NiO of the anode to Ni by supplying gas containing oxygen to the cathode and supplying gas containing hydrogen to the anode;

oxidizing the electrolyte by supplying gas containing oxygen to the cathode and stopping the supply of gas containing hydrogen to the reduced anode; and driving the solid oxide fuel cell by supplying gas containing oxygen to the cathode and supplying gas containing hydrogen to the reduced anode.

The method for driving the solid oxide fuel cell includes adjusting the solid oxide fuel cell to a driving temperature.

The driving temperature of the solid oxide fuel cell may be 600° C. or more and 650° C. or less.

When adjusting the solid oxide fuel cell to the driving temperature, air may be supplied to the anode and the cathode, respectively.

The method for driving the solid oxide fuel cell may further include: before adjusting the driving temperature, preparing the solid oxide fuel cell in which the anode, the electrolyte, and the cathode are sequentially laminated;

positioning and assembling the solid oxide fuel cell between two or more separators;

coating a sealant on the solid oxide fuel cell;

removing an additive from the sealant by increasing the temperature while supplying air to the anode and the cathode, respectively; and sealing the solid oxide fuel cell with the sealant by pressurizing the solid oxide fuel cell.

The sealant includes glass powder and may further include an additive including at least one of a binder, a plasticizer, a dispersant and a solvent. The binder, the plasticizer, the dispersant and the solvent are not particularly limited, and typical materials known in the art may be used.

The sealant may further include metal oxide.

In the removing of the additive from the sealant, the additive such as the binder, the plasticizer, the dispersant and the solvent may be removed except for the glass powder and in the case of further including metal oxide, the additive except for the glass powder and the metal oxide may be removed.

In the sealing of the solid oxide fuel cell, the additive is removed, a fluid sealant is pressurized to move to a position to be sealed and fills an empty space to seal the solid oxide fuel cell.

In the removing of the additive from the sealant, the final heating temperature may be 700° C. or more and 800° C. or less and particularly 700° C. or more and 730° C. or less.

When in the removing of the additive from the sealant, the final heating temperature is 700° C. or more and 800° C. or less and the driving temperature of the solid oxide fuel cell is 600° C. or more and 650° C. or less, the temperature is increased to remove the additive from the sealant and then may be cooled to a driving temperature of the solid oxide fuel cell.

The method for driving the solid oxide fuel cell includes reducing NiO of the anode to Ni by supplying gas containing oxygen to the cathode and supplying gas containing hydrogen to the anode.

The method for driving the solid oxide fuel cell includes oxidizing the electrolyte by supplying the gas containing oxygen to the cathode and stopping the supply of the gas containing hydrogen to the reduced anode.

The ceria-based metal oxide of the electrolyte has high ion conductivity, but has a disadvantage of low chemical stability. Particularly, in the ceria-based metal oxide, Ce tetravalent ions are easily reduced to trivalent ions by hydrogen, and the reduced ceria-based metal oxide has an increased electron conductive characteristic and a current flows.

As a result, when the electrolyte includes the reduced ceria-based metal oxide, a current may flow between the cathode and the anode by the electrolyte. As the current flows between the cathode and the anode, an open circuit voltage (OCV) drops and the energy conversion efficiency of the fuel cell may be reduced.

Before the fuel cell is driven, the electrolyte is sufficiently oxidized through the electrolyte oxidation to improve the reduction durability for hydrogen of the electrolyte containing the ceria-based metal oxide.

In the oxidizing of the electrolyte, the time for stopping the supply of the gas containing hydrogen to the reduced anode may be 2 minutes or more, particularly 2 minutes or more and 60 minutes or less, and more particularly 30 minutes or more and 40 minutes or less.

In the oxidizing of the electrolyte, oxygen partial pressure (PO2) in the cell may be $10^{-34}$ or more and 1 or less, particularly $10^{-34}$ or more and 0.2 or less, and more particularly $10^{-5}$ or more and 0.2 or less.

Herein, the oxygen partial pressure (PO2) means the number of oxygen molecules with respect to the total number of molecules in gas, and there is no separate unit.

Through the electrolyte oxidation, it can be confirmed that the electrolyte is sufficiently oxidized by a change in OCV.

Considering that the transference number of the ceria-based electrolyte is about 0.7, the open circuit voltage (OCV) determining that the electrolyte is sufficiently oxidized in the electrolyte oxidation is theoretically 875 mV or more. In other words, when the electrolyte is oxidized, it can be directly seen that when the OCV value of the solid oxide fuel cell is measured at 875 mV or more, the electrolyte is sufficiently oxidized.

The method for driving the solid oxide fuel cell includes driving the solid oxide fuel cell by supplying gas containing oxygen to the cathode and supplying gas containing hydrogen to the reduced anode.

When the solid oxide fuel cell is driven, the open circuit voltage (OCV) of the solid oxide fuel cell may be 600 mV or more and 960 mV or less.

The method for driving the solid oxide fuel cell may further include re-oxidizing the electrolyte by supplying gas containing oxygen to the cathode and stopping the supply of the gas containing hydrogen to the anode, after driving the solid oxide fuel cell.

When the solid oxide fuel cell is driven and then the OCV is gradually reduced to be 0 mV or close to 0 mV, the supply of the gas containing hydrogen supplied during the driving of the solid oxide fuel cell is stopped and the electrolyte is oxidized again, and then the OCV of the solid oxide fuel cell may be recovered by the OCV at the initial stage of driving.

Through the re-oxidizing of the electrolyte, it can be confirmed that the electrolyte is sufficiently oxidized by an OCV change which is recovered by OCV at the initial stage of driving.

The present specification provides a solid oxide fuel cell driven according to the driving method and including an anode, a cathode, and an electrolyte provided between the anode and the cathode and containing ceria-based metal oxide.

FIG. 1 schematically illustrates an electricity generation principle of a solid oxide fuel cell. The solid oxide fuel cell includes an electrolyte layer and a fuel electrode (anode) and a cathode (cathode) formed on both surfaces of the electrolyte layer. Referring to FIG. 1 illustrating the principle of electricity generation of the solid oxide fuel cell, air is electrochemically reduced at the cathode to generate oxygen ions, and the produced oxygen ions are transferred to the anode through the electrolyte layer. In the anode, fuel such as hydrogen, methanol, butane and the like is injected and the fuel is combined with the oxygen ions and electrochemically oxidized to emit electrons and generate water. This reaction causes electron transfer to an external circuit.

The cathode may include an inorganic material having oxygen ion conductivity so as to be applicable to the cathode for the solid oxide fuel cell. The kind of inorganic material is not particularly limited, but the inorganic material may include at least one of yttria stabilized zirconia (YSZ; $(Y_2O_3)_x(ZrO_2)_{1-x}$, x=0.05 to 0.15), scandia stabilized zirconia (ScSZ; $(Sc_2O_3)_x(ZrO_2)_{1-x}$, x=0.05 to 0.15), samarium doped ceria (SDC; $(Sm_2O_3)_x(CeO_2)_{1-x}$, x=0.02 to 0.4), gadolinium doped ceria (GDC; $(Gd_2O_3)_x(CeO_2)_{1-x}$, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium cobalt oxide (LSC), gadolinium strontium cobalt oxide (GSC), lanthanum strontium ferrite (LSF), samarium strontium cobalt oxide (SSC), barium strontium cobalt ferrite (BSCF), and lanthanum strontium gallium magnesium oxide (LSGM).

The cathode may include at least one of lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium cobalt oxide (LSC), gadolinium strontium cobalt oxide (GSC), lanthanum strontium ferrite (LSF), samarium strontium cobalt oxide (SSC), barium strontium cobalt ferrite (BSCF), and lanthanum strontium gallium magnesium oxide (LSGM).

The cathode may include at least one of lanthanum strontium cobalt ferrite (LSCF), lanthanum strontium cobalt oxide (LSC), and barium strontium cobalt ferrite (BSCF).

A thickness of the cathode may be 10 μm or more and 100 μm or less. Particularly, the thickness of the cathode may be 20 μm or more and 50 μm or less.

The porosity of the cathode may be 10% or more and 50% or less. Particularly, the porosity of the cathode may be 10% or more and 30% or less.

A diameter of a pore of the cathode may be 0.1 μm or more and 10 μm or less. Particularly, the diameter of the pore of the cathode may be 0.5 μm or more and 5 μm or less. More particularly, the diameter of the pore of the cathode may be 0.5 μm or more and 2 μm or less.

The method for preparing the cathode is not particularly limited, but for example, a cathode may be prepared by coating cathode slurry and drying and firing the coated cathode slurry; or forming a green sheet for the cathode by coating and drying the cathode slurry on a separate release sheet, and one or more green sheets for the cathode may be fired alone or with a green sheet of adjacent heterogeneous layers to prepare the cathode.

A thickness of the green sheet for the cathode may be 10 μm or more and 100 μm or less.

The cathode slurry includes inorganic particles having oxygen ion conductivity, and if necessary, the cathode slurry may further include at least one of a binder resin, a plasticizer, a dispersant, and a solvent. The binder resin, the plasticizer, the dispersant and the solvent are not particularly limited, and typical materials known in the art may be used.

Based on the total weight of the cathode slurry, the content of the inorganic particles having oxygen ion conductivity may be 40 wt % or more and 70 wt % or less, the content of the solvent may be 10 wt % or more and 30 wt % or less, the content of the dispersant may be 5 wt % or more and 10 wt % or less, the content of the plasticizer may be 0.5 wt % or more and 3 wt % or less, and the content of the binder may be 10 wt % or more and 30 wt % or less.

The anode may include an inorganic material having oxygen ion conductivity so as to be applicable to the anode for the solid oxide fuel cell. The kind of inorganic material is not particularly limited, but the inorganic material may include at least one of yttria stabilized zirconia (YSZ: $(Y_2O_3)_x(ZrO_2)_{1-x}$, x=0.05 to 0.15), scandia stabilized zirconia (ScSZ: $(Sc_2O_3)_x(ZrO_2)_{1-x}$, x=0.05 to 0.15), samarium doped ceria (SDC: $(Sm_2O_3)_x(CeO_2)_{1-x}$, x=0.02 to 0.4), and gadolinium doped ceria (GDC: $(Gd_2O_3)_x(CeO_2)_{1-x}$, x=0.02 to 0.4).

The anode may include the same inorganic material as the metal oxide of the electrolyte. Particularly, when the electrolyte includes ceria-based metal oxide, the anode may include the ceria-based metal oxide. More particularly, when the electrolyte includes gadolinium doped ceria, the anode may include the gadolinium doped ceria.

A thickness of the anode may be 10 μm or more and 1000 μm or less. Particularly, the thickness of the anode may be 20 μm or more and 900 μm or less.

The porosity of the anode may be 10% or more and 50% or less. Particularly, the porosity of the anode may be 10% or more and 30% or less.

A diameter of a pore of the anode may be 0.1 μm or more and 10 μm or less. Particularly, the diameter of the pore of the anode may be 0.5 μm or more and 5 μm or less. More particularly, the diameter of the pore of the anode may be 0.5 μm or more and 2 μm or less.

The method for preparing the anode is not particularly limited, but for example, a anode may be prepared by coating anode slurry and drying and firing the coated anode slurry; or forming a green sheet for the anode by coating and drying the anode slurry on a separate release sheet, and one or more green sheets for the anode may be fired alone or with a green sheet of adjacent heterogeneous layers to prepare the anode.

A thickness of the green sheet for the anode may be 10 μm or more and 100 μm or less.

The anode slurry includes inorganic particles having oxygen ion conductivity, and if necessary, the anode slurry may further include at least one of a binder resin, a plasticizer, a dispersant, and a solvent. The binder resin, the plasticizer, the dispersant and the solvent are not particularly limited, and typical materials known in the art may be used.

Based on the total weight of the anode slurry, the content of the inorganic particles having oxygen ion conductivity may be 10 wt % or more and 50 wt % or less, the content of the solvent may be 10 wt % or more and 30 wt % or less, the content of the dispersant may be 5 wt % or more and 10 wt % or less, the content of the plasticizer may be 0.5 wt % or more and 3 wt % or less, and the content of the binder may be 10 wt % or more and 30 wt % or less.

The anode slurry may further include NiO. The content of NiO may be 35 wt % or more and 60 wt % or less based on the weight of the inorganic particles having oxygen ion conductivity.

The anode may be provided on a separate porous ceramic support or a porous metal support, or may include an anode support and an anode functional layer. At this time, the anode support is a layer containing the same inorganic material as the anode functional layer, but supporting another layer due to higher porosity and a relatively larger thickness than the anode functional layer. The anode functional layer may be a layer which is provided between the anode support and the electrolyte layer to actually play a main role as the anode.

When the anode is provided on the porous ceramic support or the porous metal support, the prepared green sheet for the anode is laminated on the fired porous ceramic support or porous metal support and then fired to prepare the anode.

When the anode includes the anode support and the anode functional layer, the anode may be prepared by laminating a green sheet for the prepared anode functional layer on the fired anode support and then firing the laminated green sheet.

When the anode includes the anode support and the anode functional layer, the thickness of the anode support may be 350 μm or more and 1000 μm or less, and the thickness of the anode functional layer may be 5 μm or more and 50 μm or less.

The electrolyte may include ceria-based metal oxide.

The ceria-based metal oxide is not particularly limited as long as having oxygen ion conductivity, but particularly, the ceria-based metal oxide may include at least one of samarium doped ceria and gadolinium doped ceria, and more particularly gadolinium doped ceria.

A thickness of the electrolyte may be 10 μm or more and 100 μm or less. Particularly, the thickness of the electrolyte may be 20 μm or more and 50 μm or less.

The method for preparing the electrolyte is not particularly limited, but for example, a electrolyte may be prepared by coating electrolyte slurry and drying and firing the coated electrolyte slurry; or forming a green sheet for the electrolyte by coating and drying the electrolyte slurry on a separate release sheet, and one or more green sheets for the electrolyte may be fired alone or with a green sheet of adjacent heterogeneous layers to prepare the electrolyte.

A thickness of the green sheet for the electrolyte may be 10 µm or more and 100 µm or less.

The electrolyte slurry includes ceria-based metal oxide particles, and if necessary, the anode slurry may further include at least one of a binder resin, a plasticizer, a dispersant, and a solvent. The binder resin, the plasticizer, the dispersant and the solvent are not particularly limited, and typical materials known in the art may be used.

Based on the total weight of the electrolyte slurry, the content of the ceria-based metal oxide particles may be 40 wt % or more and 70 wt % or less.

Based on the total weight of the electrolyte slurry, the content of the solvent may be 10 wt % or more and 30 wt % or less, the content of the dispersant may be 5 wt % or more and 10 wt % or less, the content of the plasticizer may be 0.5 wt % or more and 3 wt % or less, and the content of the binder may be 10 wt % or more and 30 wt % or less.

In the present specification, the green sheet means a film-like membrane which may be processed in a next process other than a complete end product. In other words, the green sheet is coated with a coating composition containing the inorganic particles and the solvent and then dried in a sheet form and means a semi-dried sheet capable of maintaining a sheet form while including a small amount of solvent.

The form of the fuel cell is not limited, and for example, may be a coin type, a plate type, a cylinder type, a horn type, a button type, a sheet type, or a laminated type.

The fuel cell may be particularly used as power of an electric vehicle, a hybrid electric vehicle, a plug-in hybrid electric vehicle or a power storage device.

The present specification provides a battery module including the fuel cell as a unit cell.

FIG. 2 schematically illustrates an embodiment of a battery module including a fuel cell, and the fuel cell includes a battery module 60, an oxidizer supply unit 70, and a fuel supply unit 80.

The battery module 60 includes one or more fuel cells described above as unit cells, and includes separators interposed between the unit cells when two or more unit cells are included. The separator serves to prevent the unit cells from being electrically connected to each other and transmit the fuel and the oxidizer supplied from the outside to the unit cells.

The oxidizer supply unit 70 serves to supply the oxidizer to the battery module 60. As the oxidizer, oxygen is representatively used, and oxygen or air which is injected into the oxidizer supply unit 70 may be used.

The fuel supply unit 80 serves to supply the fuel to the battery module 60 and includes a fuel tank 81 storing the fuel and a pump 82 supplying the fuel stored in the fuel tank 81 to the battery module 60. As the fuel, gas or liquid hydrogen or hydrocarbon fuel may be used. Examples of the hydrocarbon fuel may include methanol, ethanol, propanol, butanol or natural gas.

Hereinafter, the present specification will be described in more detail through Examples. However, the following Examples are just to exemplify the present specification and the present specification is not limited thereto.

EXAMPLES

Preparation Example

A solid oxide fuel cell used for measurement was prepared by an anode support layer (ASL), an anode functional layer (AFL), an electrolyte layer (EL), and a cathode layer (CL).

ASL slurry used GDC and NiO as an inorganic material, and in this case, a ratio of GDC and NiO was 50:50 vol %. Further, the ASL slurry included a dispersant, a plasticizer, and a binder resin together with a solvent and was added with 50.2 wt % of the inorganic material, 18.2 wt % of the solvent, 6.2 wt % of the dispersant, 1.2 wt % of the plasticizer and 24.2 wt % of the binder based on the entire weight of the slurry. The ASL slurry was tape-cast to obtain an ASL green sheet having a thickness of 100 µm to 200 µm.

AFL slurry had the same organic material as the ASL slurry except for the inorganic material, but a composition ratio of GDC and NiO was 60:40 vol %, and an AFL green sheet having a thickness of 10 µm thinner than that of the ASL was cast.

EL slurry had the same organic material as the ASL slurry except for the inorganic material, but the inorganic material was made of GDC alone without NiO, and an EL green sheet having a thickness of 20 µm was cast using the EL slurry.

The ASL green sheet, the AFL green sheet and the EL green sheet were sequentially laminated and then sintered at 1400° C. to prepare a half cell. In this case, thicknesses of the ASL, the AFL, and the EL after sintering were 800 µm, 20 µm, and 20 µm, respectively.

An LSCF cathode composition containing 60 wt % of LSCF6428 ($La_{0.6}Sr_{0.4}Co_{0.2}Fe_{0.8}O_{3-\delta}$) and 40 wt % of ESL441 as a binder composition based on the total weight of the entire composition was prepared in a form of paste using a three roll mill.

The LSCF cathode composition was coated on the electrolyte layer of the above-prepared half cell by screen printing, dried, and then heat-treated at 1000° C. to form a cathode.

Process Example 1

An SOFC stack to which a GDC electrolyte prepared in the Preparation Example was applied was driven by supplying hydrogen to an anode while supplying air to a cathode for about 2 hours at 600° C. to reduce NiO to Ni and immediately supplying air and fuel to the cathode and the anode, respectively, without electrolyte oxidization.

At this time, a current I and a voltage V were measured and a stack output I×V was calculated, and as a result, the output according to Process Example 1 was 19.28 W (see FIG. 5).

As the result of measuring an open circuit voltage (OCV), it was confirmed that an initial OCV was 840 mV and the OCV was decreased to 0 after 18 hours.

Process Example 2

An SOFC stack to which a GDC electrolyte prepared in the Preparation Example was applied was driven by reducing an anode at 600° C. and then supplying air and fuel to the cathode and the anode, respectively, without electrolyte oxidization, and thereafter, when the fuel supply was immediately stopped in an initial OCV state, it can be seen that the OCV was decreased to 680 mV through FIG. 4 (left).

However, through FIG. 4 (right), it can be seen that in the same condition, when the air in the cathode is stopped, the electrolyte is rapidly completely reduced and the OCV becomes 0 mV.

As a result, it can be seen that when the electrolyte is exposed to a reducing atmosphere, the anode and the cathode are electrically shorted and the OCV becomes 0.

Process Example 3

An SOFC stack to which a GDC electrolyte prepared in the Preparation Example was applied was driven by supplying hydrogen to an anode while supplying air to a cathode for about 2 hours at 600° C. to reduce NiO to Ni and then, immediately supplying air and fuel to the cathode and the anode, respectively.

An initial OCV was 840 mV and as the result of measuring an open circuit voltage (OCV), it was confirmed that the OCV was decreased to 0 after 18 hours.

According to FIG. 3, as the result of measuring the OCV while driving, it was confirmed that the GDC electrolyte was reduced and the OCV was gradually decreased and finally, the OCV becomes 0. In this case, while the air supply to the cathode was maintained, the fuel supply to the anode was cut off for about 2 hours. As a result, it was confirmed that the initial OCV value was recovered to 840 mV.

Process Example 4

An SOFC stack to which a GDC electrolyte prepared in the Preparation Example was applied was driven by supplying hydrogen to an anode while supplying air to a cathode for about 2 hours at 600° C. to reduce NiO to Ni. Thereafter, the SOFC stack was driven by stopping the supply of hydrogen for 45 minutes to oxidize the electrolyte by oxygen of the air supplied to the cathode and immediately supplying air and fuel to the cathode and the anode, respectively. The result of measuring the open circuit voltage (OCV) was illustrated in FIG. 3.

At this time, a current I and a voltage V were measured and a stack output I×V was calculated, and as a result, the output according to Process Example 4 was 57.7 W (see FIG. 5). As a result, it can be seen that the reduction stability of the electrolyte is increased and the stack output is increased through the electrolyte oxidation before the cell driving.

An initial OCV was 840 mV and as the result of measuring an open circuit voltage (OCV), it was confirmed that the OCV was decreased to 0 after 18 hours.

The invention claimed is:

1. A method for driving a solid oxide fuel cell including an anode containing NiO, a cathode, and an electrolyte provided between the anode and the cathode, the electrolyte containing a ceria-based metal oxide, the method comprising:
adjusting the solid oxide fuel cell to a driving temperature;
reducing NiO of the anode to Ni by supplying a gas containing oxygen to the cathode and supplying a gas containing hydrogen to the anode;
oxidizing the electrolyte by supplying the gas containing oxygen to the cathode and stopping the supply of the gas containing hydrogen to the reduced anode; and
driving the solid oxide fuel cell by supplying the gas containing oxygen to the cathode and supplying the gas containing hydrogen to the reduced anode.

2. The method of claim 1, wherein the ceria-based metal oxide includes at least one material selected from the group consisting of samarium doped ceria and gadolinium doped ceria.

3. The method of claim 1, wherein in the oxidizing of the electrolyte, a time of stopping the supply of the gas containing hydrogen to the reduced anode is 2 minutes or more and 60 minutes or less.

4. The method of claim 1, wherein the driving temperature of the solid oxide fuel cell is 600° C. or more and 650° C. or less.

5. The method of claim 1, wherein in the oxidizing of the electrolyte, an oxygen partial pressure (PO2) in the cell may be $10^{-34}$ or more and 1 or less.

6. The method of claim 1, wherein in the oxidizing of the electrolyte, an oxygen partial pressure (PO2) in the cell may be $10^{-34}$ or more and 0.2 or less.

7. The method of claim 1, wherein in the oxidizing of the electrolyte, an oxygen partial pressure (PO2) in the cell may be $10^{-5}$ or more and 0.2 or less.

* * * * *